Figure 1:
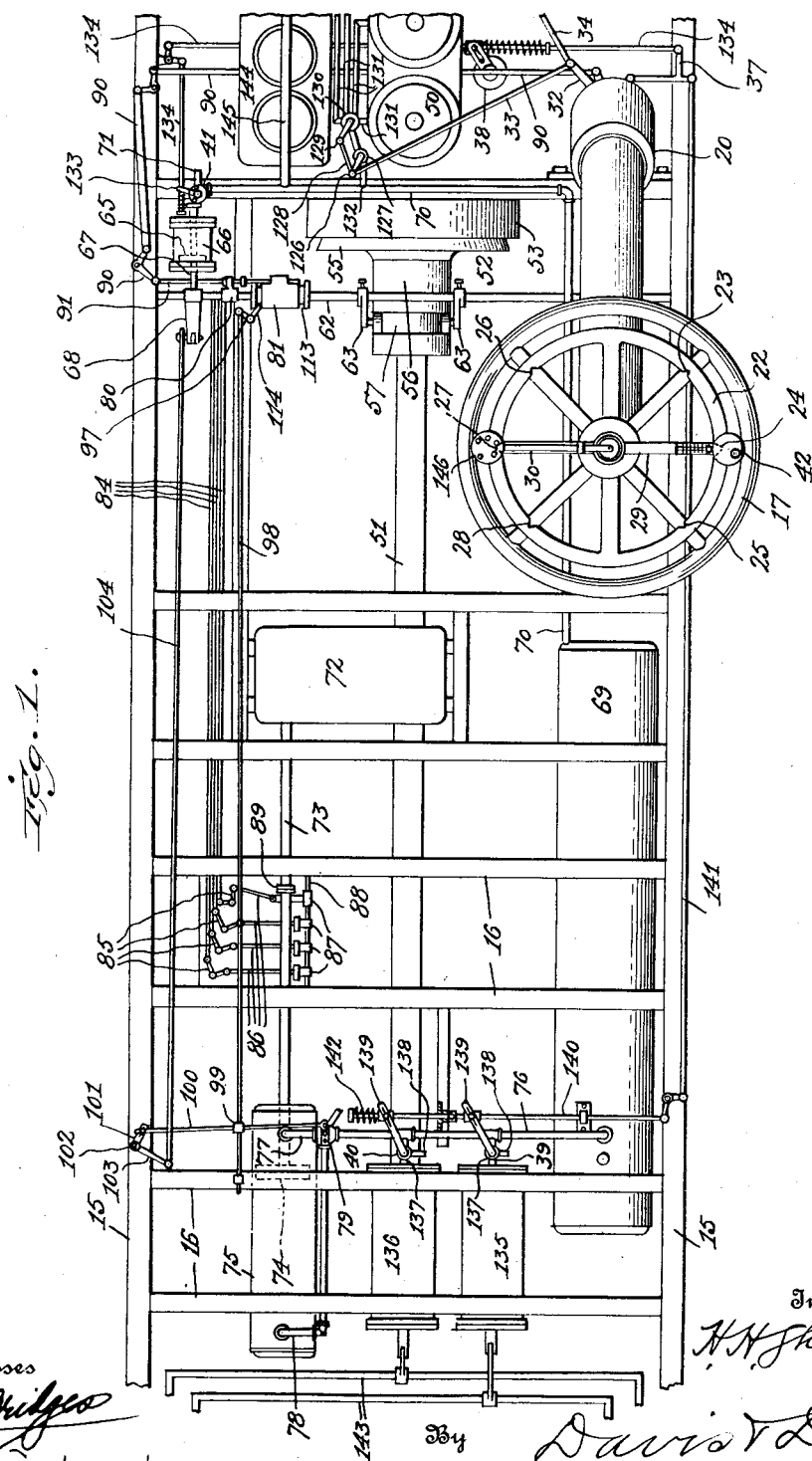

H. H. SHELTERS.
MOTOR VEHICLE CONTROLLING MECHANISM.
APPLICATION FILED DEC. 23, 1913.

1,141,421.

Patented June 1, 1915.
4 SHEETS—SHEET 1.

Witnesses

Inventor
H. H. Shelters
By Davis & Davis
Attorneys

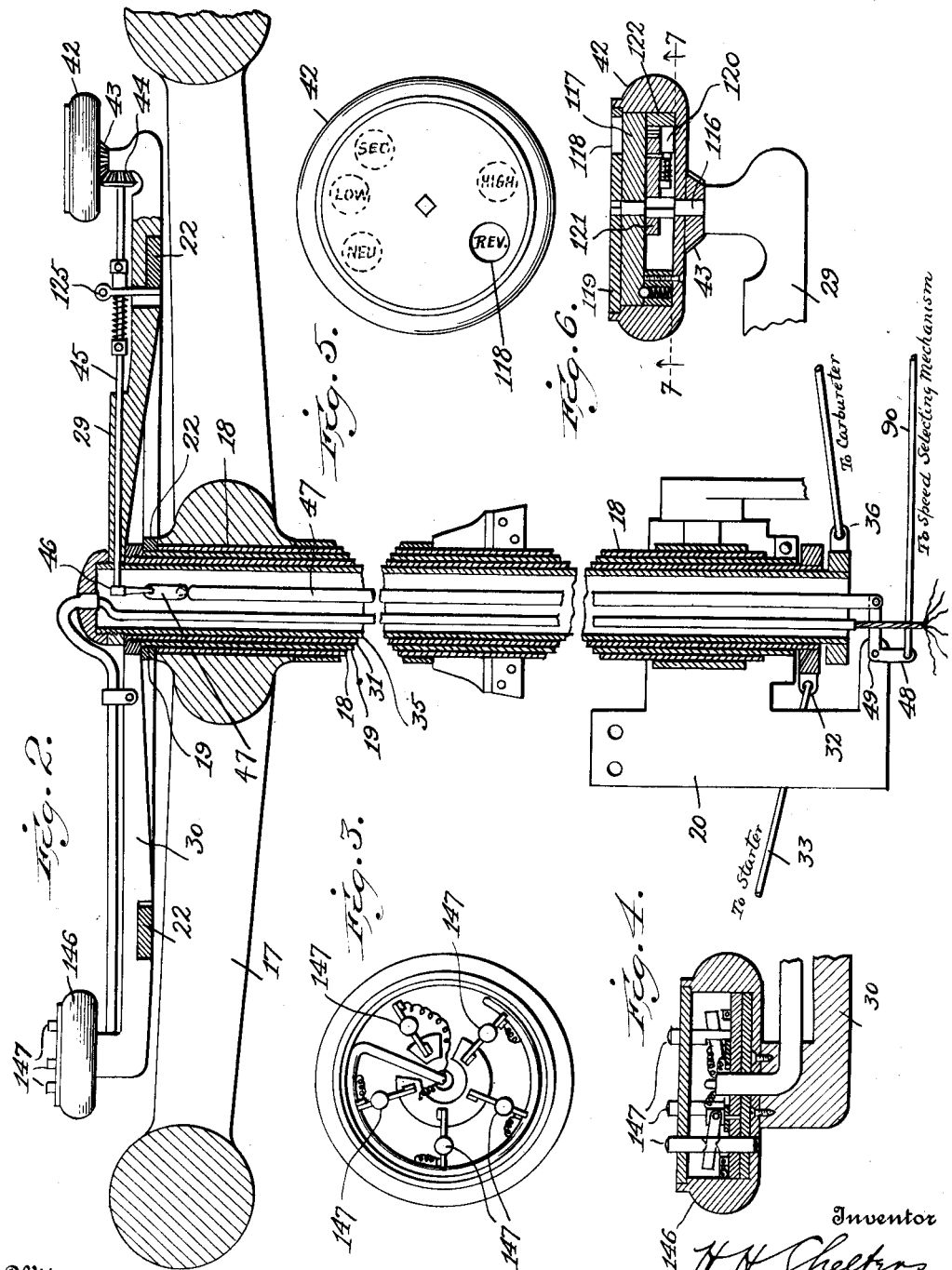

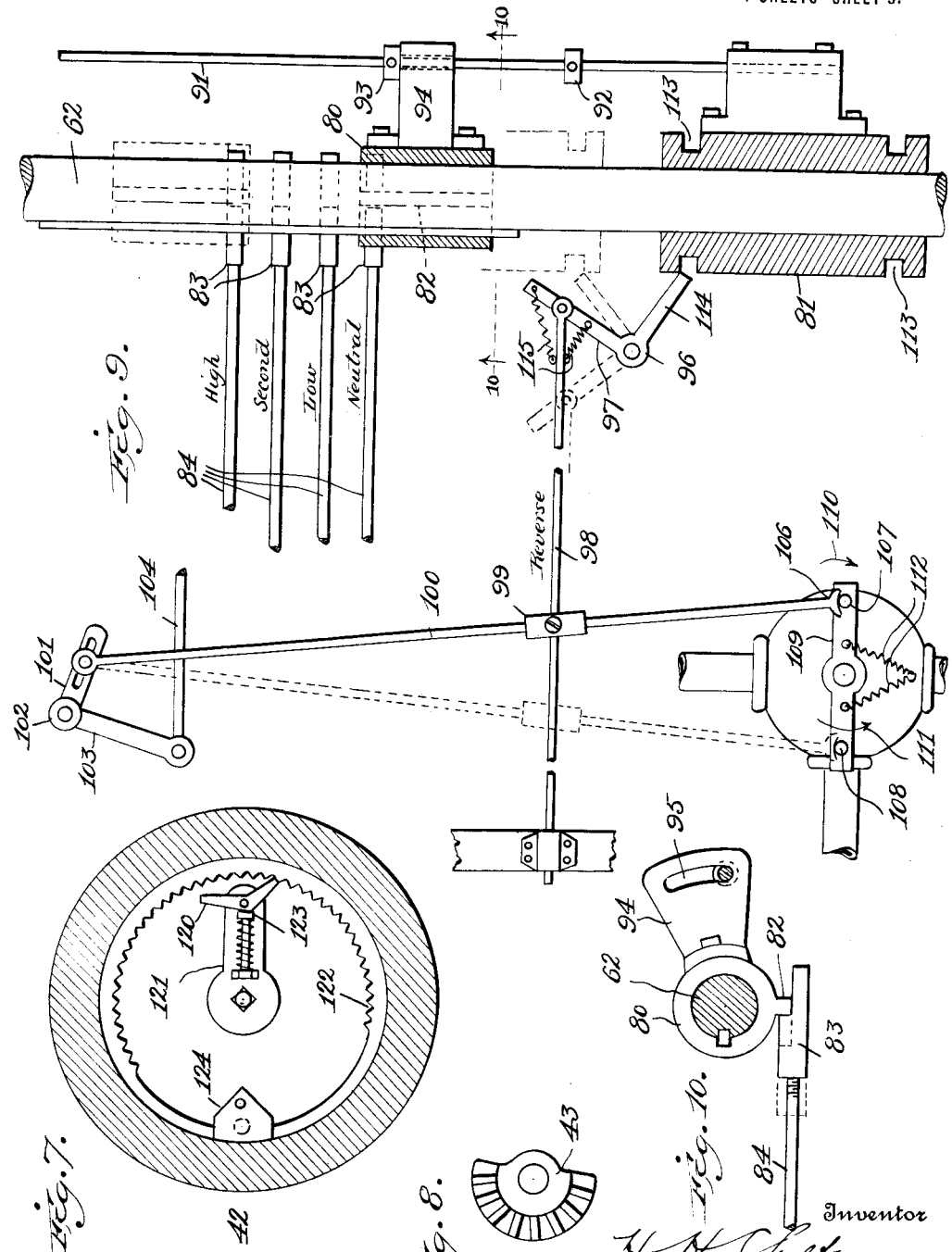

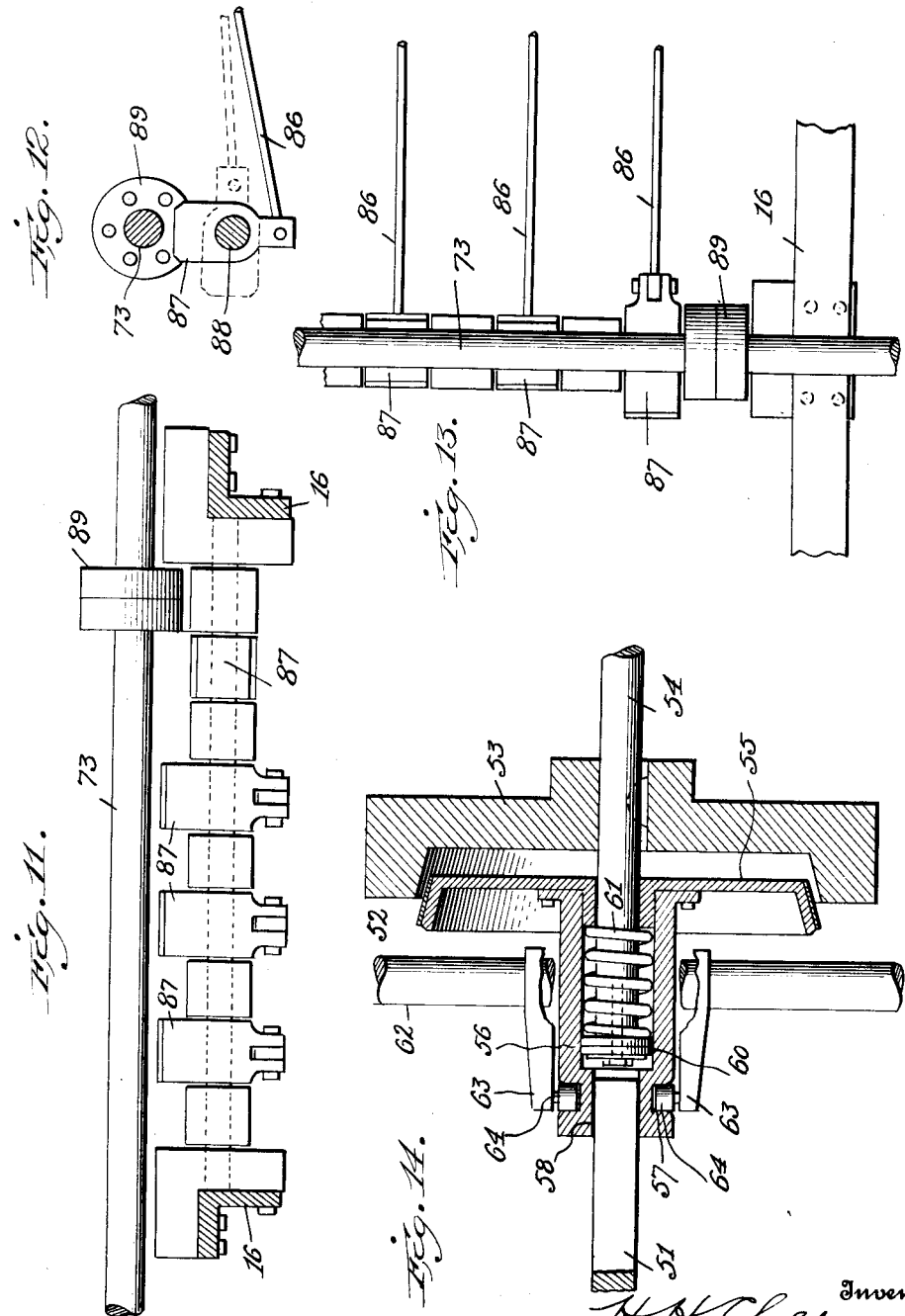

UNITED STATES PATENT OFFICE.

HIRAM H. SHELTERS, OF ROCK ISLAND, QUEBEC, CANADA.

MOTOR-VEHICLE CONTROLLING MECHANISM.

1,141,421.  Specification of Letters Patent.  Patented June 1, 1915.

Application filed December 23, 1913. Serial No. 808,475.

*To all whom it may concern:*

Be it known that I, HIRAM H. SHELTERS, a citizen of the United States of America, and a resident of Rock Island, Province of Quebec, Dominion of Canada, have invented certain new and useful Improvements in Motor-Vehicle Controlling Mechanism, of which the following is a full and clear specification, reference being had to the accompanying drawings.

This invention relates to improvements in control mechanism for motor vehicles, and is especially, though not exclusively, adapted for the progressive sliding gear type, and its particular object is to avoid the use of the levers and pedals commonly used in connection with the brakes, clutch, and transmission, and control the different mechanisms of the vehicle from the spark and throttle levers without conflicting with their original duties. These and other objects hereinafter set forth are attained by the means illustrated in the accompanying drawings, in which—

Figure 1 is a plan view, somewhat diagrammatical, of a portion of an automobile chassis having the control system thereon. Fig. 2 is a vertical sectional view through the steering wheel and post showing portions of the control mechanisms mounted therein. Figs. 3 and 4 are a plan and vertical section, respectively, of the spark-lever dial, the cover in the plan view being removed. Figs. 5 and 6 are a plan and vertical section, respectively, of the throttle-lever dial. Fig. 7 is a sectional view on the line 7—7 of Fig. 6. Fig. 8 is a detail plan view of the gear segment on the bottom of the throttle-lever dial. Fig. 9 is an enlarged detail view of the selecting mechanism. Fig. 10 is a detail section on the line 10—10 of Fig. 9. Figs. 11, 12 and 13 are detail views of the position regulators of the sliding gears of the transmission; and Fig. 14 is a horizontal section through the clutch.

Similar reference numerals in all of the figures of the drawings, designate like parts.

In the drawings, the frame is composed of longitudinal and transverse bars 15 and 16, respectively, and has mounted thereon, near one end, the usual steering-wheel 17 for guiding the vehicle. Steering-wheel 17 is mounted on the upper end of a tubular post 18 which is supported by and surrounds a fixed tubular support 19, which in turn is supported and secured to a supporting bracket 20 in any suitable manner, and said steering post 18 is connected at its lower end to operate in the usual way the front wheels of the vehicle.

At the top of the fixed tubular support 19 is rigidly supported a stop-ring 22 provided with notches 23, 24, 25, 26, 27 and 28, which form stops for the throttle-levers 29 and the spark-lever 30. Spark-lever 30 is rigidly secured to the top end of a tube 31 in a manner to rotate said tube, and at its bottom end, said tube is provided with a radial arm 32 which is connected by the rods 33 and 34, Fig. 1, to a self-starting mechanism and magnets respectively. Throttle-lever 29 is rigidly secured to the top end of a tube 35, also in a manner to rotate said tube, and said tube is provided at its bottom end with an arm 36 which is connected, by an angle lever 37 and other suitable means, to the carbureter 38, brake valves 39 and 40, and clutch-cylinder valve 41.

Mounted to rotate on the outer end of the throttle-lever 29 is a speed button 42, horizontally disposed in a plane above the lever, and which is provided on its lower side with a beveled gear segment 43 adapted to rotate a beveled gear 44 secured upon one end of a rock-shaft 45 having a crank-arm 46 secured upon its other end and positioned within the tubular members of the steering-post, said crank-arm 46 being connected to a rod 47 having a universal joint 47 therein and which extends downwardly through the tubular members, and connected at its lower end to an angle lever 48 pivoted at 49 upon the bracket 20, and which in turn is connected by suitable rods and angle levers, to the speed selecting mechanism hereinafter described.

The engine 50 is connected to the driving shaft 51 through the clutch 52, the same comprising the female member 53, which is keyed to the crank shaft 54, and the male member 55 which is mounted to slide on said crank shaft and which has secured to it a sleeve 56, having an annular groove 57 and a central recess 58 at one end, said recess being angular in cross-section to receive the end of the driving shaft 51, the end of said driving shaft being formed to loosely fit the said recess so that the sleeve will turn with the driving shaft and at the same time allow of its sliding thereon. One end of the engine crank-shaft is supported within the sleeve 56 in a ball-bearing 60 which is secured thereto and has mounted thereon, between said ball-bearing and the hub of the member 55, a coil spring 61 for a purpose hereinafter set forth. Clutch member 55 is operated into and out of engagement by the rock-shaft 62 which is journaled on the frame of the machine and is provided with crank-arms 63 having rollers 64 on their ends which engage in the annular groove 57 of the sleeve 56. Thus, when the shaft 62 is rocked in either direction, it moves the clutch member 55 in a corresponding direction, and either applies to or releases said clutch member from the member 53.

Rock-shaft 62 is operated by pneumatic pressure through a piston 65 in a cylinder 66, the piston rod 67 of which is connected to a crank-arm 68 secured to said rock-shaft. Air under pressure is supplied to cylinder 66 from a tank 69, through piping 70 in which is located the valve 41 which is provided with an exhaust 71, for the purpose of exhausting the air from the cylinder to allow the rock-arm 62 to return to its normal position.

The transmission case 72, in the present instance, contains the ordinary sliding type of gear transmissions, not shown, and the sliding gears are connected to a piston-rod 73, of a piston 74, in a cylinder 75. This piston 74 is maintained in adjusted positions in its cylinder by an equal pressure of air on both sides, the air being supplied from the tank 69 through the pipe 76 and branches 77 and 78 which lead to opposite ends of the cylinder.

The air pressure in the cylinder 75 is controlled by a valve 79, placed at the junction of the branches 77, 78, and the pipe 76, the means for operating the same being described hereafter.

The speed selecting mechanism is also pneumatically operated simultaneously with the clutch, and is operated from the same cylinder 66 through the rock-shaft 62, and embodies a speed selecting sleeve 80 and a reverse sleeve 81, both of which are slidably mounted upon the rock-shaft 62. The sleeve 80 is splined on said shaft to cause it to rock or rotate therewith, and provided with a longitudinal rib 82, Fig. 10, which is adapted to engage the heads 83 on the ends of the longitudinal shiftable rods 84, whose other ends are connected to one arm of suitable angle levers 85, which have their other arms connected by rods 86 to the rotatable stops 87 mounted on the bar 88. Stops 87 normally assume a vertical position, as shown clearly in full lines in Fig. 12, in the path of a collar 89 fixed on the rod 73, and it is obvious, should stops be thrown to the position shown in dotted lines, the collar on the piston will pass the particular stop or stops that have been thrown down and engage the first vertical stop, thereby limiting the throw of the piston-rod 73 and positioning the sliding gears for the desired speed. It is understood that the stops are operated successively from the ends of the group.

The stops just described are selected by the selecting sleeve 80, which is moved on the rock-shaft 62 to engage successively the heads 83, and said movement is controlled by the button 42, on the throttle-lever 29, through the beveled gears 43 and 44, shaft 45, crank 46, rod 47, angle-lever 48, rod and bell-crank connections 90, and the selecting rod 91, which is provided with buttons 92 and 93 that engage the extension 94 fixed to the sleeve 80. The rod 91 passes through a slot 95 in the extension 94, said slot being long enough to allow of the rocking of the sleeve. Thus it will be seen, from inspection of Fig. 9, that, should the sleeve 80, which is now in engagement with the neutral rod 84, be moved in the direction of the top of the sheet, it will successively engage the low-speed rod, the second-speed rod, and finally the high-speed rod. It will be understood, that when said sleeve 82 is in engagement with the first three rods, they will all be operated, but when it is moved to the high-speed rod in the same direction, it passes the first three rods and engages the high-speed rod only. In moving in the opposite direction, the operation is vice versa; it engages the first three rods and then passes them to engage the neutral rod alone.

The sliding gears of the transmission are operated pneumatically by admitting and exhausting air from the ends of the cylinder 75. Thus, if it is desired to move from neutral to low-speed, or from the position shown in the drawings, air is exhausted from the left end of the cylinder and admitted to the right end through the valve 79, thereby forcing the piston 74 to the left until the collar 89 engages the second stop 87 which positions the sliding gears at low-speed.

To reverse the direction of movement of speed, that is, in the direction from high to neutral, instead of neutral to high, valve 79 is constructed in a manner to admit or exhaust from either end of the cylinder 75, and the valve is also controlled from the throttle-lever dial 42 with the same connections that operate the selecting sleeve 80, the rod 91 being connected in any suitable manner to the reverse sleeve 81, which as before stated is mounted to slide on shaft 62 but not to rotate therewith, and said sleeve 81 is adapted to engage an angle-lever 96, one arm 97 of which is connected to a shiftable rod 98 which is mounted in suitable bearings on the main frame. This rod 98 has pivoted thereto a sleeve 99, through which passes a lever 100 that is pivoted to one arm of an angle-lever 101, the angle-lever being pivoted at 102 upon the main frame, and has connected to its arm 103, one end of a rod 104, the other end of which is connected to a crank-arm 68 secured to the rock-shaft 62. The free end of lever 100 is formed with a head 106 having a slight depression on one side, said depression being adapted to engage either pin 107 or 108 on a centrally pivoted lever 109 which operates the valve 79. Thus it will be seen that, when a change in the direction of the speed is desired, by shifting the sleeve 81 the lever 96 is operated and the rod 100 is moved from one of the pins on the valve lever 109 to the other pin. Then when the shaft 62 is rocked, the crank-arm 68 operates the rod 104, lever 101, and forces the lever 100 against the pin on the valve-lever 109 and operates the valve. A movement of the valve in the direction of the arrow 110 exhausts the right-hand end of the cylinder 75 and allows the piston to move in that direction, viz.;—from high-speed to reverse, and, when moved in the direction of the arrow 111, the piston will move in the opposite direction from reverse to high-speed. Valve lever 109 is balanced in position by the springs 112.

Reverse sleeve 81 is formed with annular grooves 113 near each end, the shoulders formed by said grooves being adapted to engage the arm 114 of the angle-lever 96, and operate said angle-lever back and forth to shift the lever 100 from one pin to the other, one groove actuating the lever 96 in one direction and the other in a reverse direction. Equalizing springs 115 secured to rod 98 and arm 97 of angle-lever 96 serve to keep a tension on the angle-lever so that the end of the arm 114 will positively intersect the grooves 113 in the sleeve 81.

In order to reverse the speed at any speed, the buttons 92 and 93 are properly spaced relative to the extension 94, so that there is always sufficient lost motion between these coöperating parts to allow of the shifting of the reverse sleeve without moving the selector; in other words, in the position shown in Fig. 9, the reverse sleeve 81 can be moved sufficiently to throw the arms 100 from one position to another before the button 92 engages the extension 94 and operates the selector sleeve 82.

Button 42 on the end of the throttle-lever 29 is mounted to rotate upon a stud 116, and said button comprises an outer casing in which is fixed to rotate therewith a dial 117 having indicating marks thereon designating the different speeds, such as, Reverse, Neutral, Low, Second, and High. These indicating marks are observed through an aperture 118 in a disk or plate 119 fixed against rotation on the end of the stud 116. Thus, when a certain speed is desired, the button and its indicating dial are turned until the proper indicating mark is exposed through the aperture of the fixed top plate.

To lock the dial in its respective adjusted positions, a double-toothed pawl 120 is pivoted to an arm 121 fixed against rotation on the stud 116, said pawl being adapted to engage a circular rock-bar 122 fixed to the button 42 to rotate therewith, and said pawl is held into engagement with said teeth, by the spring-pressed plunger 123. A double pawl is used so that the button can be locked in the reverse movement of the button, and the pawl is reversed by the cam 124 which in its rotation with the button will strike the apex of the pawl and reverse it.

It will be observed that the teeth of the rock-bar 122 do not extend entirely around the circumference, leaving an untoothed portion, whereby the button can be shifted back and forth from high-speed to second-speed and reverse to neutral without turning the button to the extreme reversing positions.

Throttle-lever 29 is provided with a spring-held pin 125 which is adapted to engage the notches in the stop-ring 22, to hold the lever in its adjusted positions.

As before described, the self-starting mechanism is controlled from the spark-lever 30, through the tube 31, radial arm 32, and the rod 33, said rod having one end connected to an arm 126 of a general supply valve 127, the same being connected by a link 128 to an arm 129 of a distributing valve 130 which controls the air pressure to a series of pipes 131 leading to the respective cylinders of the engine 50. Air is supplied from the main tank 69 to the general supply valve 127, through the pipe 70 and connection 132.

Valve 41 is provided with an arm 133 which is operated by the rods 134 extending from the angle-lever 37, and said valve 41 is also provided with suitable stops to limit the throw of the arm 133 in either direction, to admit air into the cylinder 66 or exhaust therefrom.

Brake valves 39 and 40 are connected to the primary brake-cylinder 135 and the emergency brake-cylinder 136, respectively, and to the air pipe 76, by the connections 137, and each of these valves is provided with suitable exhausts 138 and operating arms 139 which are pivoted to a reciprocating rod 140 that is operated by a rod 141 connected to one arm of the angle-lever 37. The primary brake valve 39 is operated positively by the arm 140, but the emergency brake valve is operated indirectly through the spring 142, which allows the primary brake to be operated initially and retards the operation of the emergency brake until the said spring 142 is compressed. The piston rods of the pistons in both primary and emergency cylinders are connected in any suitable manner with the brake-beams 143.

Air tank 69 is supplied with air from the pump 144 through the pump-pipe 145 and pipe 70, and it is understood that said pump has suitable connections with the engine whereby it can be cut in automatically or manually when desired.

Spark-lever 30 is provided with a control disk 146 having a series of finger plungers 147 which operate suitable switches in the disk 146 to close circuits of a series of wires which form a cable that is supported by the spark-lever and extends through the hollow steering post; the individual wires are then led to their respective electrically-operated mechanisms, such as the different lights, the electric horn and other electric devices.

Assuming that the vehicle is at a stop and the different mechanisms are in the positions shown in the drawings, that is, the engine not running, the brakes released, the clutch disengaged, the selector sleeve 80 engaged with the neutral selector rod, with the piston in the right end of the cylinder 75, the speed button 42 turned to the position showing the reverse position, and the throttle-lever 29 engaged with the stop 24, the operation for starting the vehicle and changing the speed is as follows: One of the finger plungers 147 on the spark-lever is depressed to connect in the ignition mechanism, not shown; then the throttle-lever is thrown to notch 23 which will operate valve 40 and apply the primary brake. The spark-lever 30 is then pulled to notch 28 which will open valves 127 and 130 and allow the air to rush into the various cylinders and turn the motor. When the motor starts, push the spark-lever 30 back to notch 27 which will close the valves 127 and 130, and continue this movement of the spark-lever toward the notch 26 to advance the spark. Now move the throttle-lever 29 back to notch 24 and the primary-brake will release, and continue the movement of lever 29 toward notch 25, about one-half the distance between notches 24 and 25, and valve 41 will close enough to allow the air from cylinder 66 to exhaust, thereby releasing the air pressure that is holding selecting sleeve 80 in engagement with the neutral rod and the spring 61 in the clutch then rocks the shaft 62 which turns the sleeve 80 back to its normal position to be again operated by turning the speed-button 42 to select any desired speed. Assuming that the low-speed is desired, the speed-button 42 is turned to the left until the Low appears through the aperture 118; this will operate the rods 90 and 91, pulling the reverse-sleeve 81 toward the selecting-sleeve 80 and the stop 92 on the rod 91 will engage the selecting-sleeve 80 and move it in position to engage both the neutral and low selecting-rods 84. The throttle-lever is then pulled to notch 24 which operates the valve 41 and admits air to the cylinder 66 and forces its piston to rock the shaft 62 operating the two selecting-rods, neutral and low, causing the first two stops 87 to turn out of the path of the collar 89 on the piston rod 73. The movement of the reverse-sleeves 81 will operate the rod 98 and shift the lever 100 to pin 108 of the valve 79, so that air will exhaust from the left end of cylinder 75 and cause the piston 73 to move to the left until the collar 89 seats against the third stop 87 from the right end of the series. Then the gears are in low speed with the clutch 53, 55, disengaged. Throttle-lever 29 is then pulled to notch 25 and this will exhaust cylinder 66 allowing shaft 62 to rock back and the clutch to engage and operate valve 79 to equalize the pressure in cylinder 75, and the vehicle will then move in low speed. The exhausting from either end of cylinder 75 may be quick or slow at the will of the operator, according to the speed he shifts the throttle-lever from notch 24 to notch 25. To open the carbureter valve 38, throttle-lever 29 is advanced from notch 25 toward a neutral point on the stop-ring 22.

To change from low to second speed, turn button 42 to the left until it indicates second speed, pull the throttle-lever 29 to notch 24, and then to notch 25. This repeats the movements of the several parts as in moving from reverse to low speed.

To change from second to high speed, button 42 is turned to the left until high speed is indicated and the throttle-lever 29 is moved to notch 24 and back to notch 25. It will be observed that in going from second to high speed, button 42 is turned a greater distance than between the other speeds which will move selector-sleeve 81 to its most remote position in one direction engaging only the high-speed rod 84 as shown in dotted lines in Fig. 9, and leaving it in a position to be moved gradually back from high to second speed and so on.

It will be understood that valve 130 will be timed with the engine so as to distribute the air pressure to the cylinder firing, and will work in connection with 127, the same being disengaged from the engine until valve 127 is opened to start the motor.

From the above description, it will be seen that mechanism is provided for controlling all the operating parts of a motor vehicle from the steering wheel, thereby avoiding the use of separate levers pivoted upon the body of vehicle for applying the brakes and shifting the sliding-gears.

Having thus fully described the invention, what is claimed is:

1. In a motor vehicle, a steering-wheel, a throttle-lever mounted adjacent thereto, fluid operated means for manipulating a plurality of control mechanisms of the vehicle, and means attached to said throttle-lever for controlling said fluid operated means.

2. In a motor vehicle, a steering-wheel, a throttle-lever mounted adjacent thereto, a transmission having a changing-gear, a fluid-operated means for manipulating said changing-gear, a speed selecting mechanism, and means attached to said throttle-lever for controlling said speed selecting mechanism and said fluid-operated means.

3. In a motor vehicle, a steering-wheel, a throttle-lever mounted adjacent thereto, a transmission having a changing-gear, a fluid-operated means for manipulating said changing-gear, a speed selecting mechanism, a fluid-operated brake operating means, and means attached to said throttle-lever for controlling said speed selecting mechanism and said brake operated means.

4. In a motor vehicle, a steering-wheel, a throttle-lever mounted adjacent thereto, a transmission having a changing-gear, a fluid-operated means for manipulating said changing-gear, a speed selecting mechanism, fluid-operated means for manipulating said selecting mechanism and controlling the fluid-operated means for the changing-gear, and means attached to said throttle-lever for controlling said fluid-operated means which manipulates the said selecting mechanism.

5. In a motor vehicle, a steering-wheel, a throttle-lever mounted adjacent thereto, a transmission having a changing-gear, a fluid operated means for manipulating said changing-gear, a speed-selecting mechanism, an engine-clutch, fluid operated means for manipulating said selecting mechanism, the engine clutch and for controlling the fluid operated means of the changing-gear, and means attached to said throttle-lever for controlling said fluid operated means which manipulates the said selecting mechanism.

6. In a motor vehicle, a steering-wheel, a throttle-lever mounted adjacent thereto, a transmission having a changing gear, a speed selecting mechanism, fluid operated means for manipulating said changing gear and speed selecting mechanism, and means attached to said throttle-lever for controlling said speed selecting mechanism.

7. In a motor vehicle, a steering-wheel, a throttle-lever mounted adjacent thereto, a transmission having a changing gear, a rock shaft, a speed selecting sleeve on said shaft, means on said lever for operating said sleeve, a plurality of stops operated by said sleeve, and separate pneumatically operated means controlled by said lever for rocking said shaft to cause the sleeve to operate the stops and operate the changing gear respectively.

8. In a motor vehicle, a steering-wheel, a throttle-lever mounted adjacent thereto, a transmission having a changing gear, a rock-shaft, a reversing sleeve on said shaft, an air valve, means for operating said valve, means on said throttle-lever for operating said sleeve, connecting means between said valve operating means and sleeve and operated by said sleeve for shifting said valve operating means from one side of said valve to the other, and a pneumatically operated means controlled by said valve for shifting the changing gear.

9. In a motor vehicle, a steering-wheel, a throttle-lever mounted adjacent thereto, a transmission having a changing gear, a rock shaft, a speed selecting sleeve and a reversing sleeve on said shaft, means on said throttle-lever for sliding both of said sleeves on said shaft, a plurality of stops operated by said selecting sleeve, an air valve, a pneumatically operated means for rocking said selecting sleeve and operating said valve, means operated by said reversing sleeve for reversing the rotation of said valve, and a pneumatically operated means controlled by said valve for shifting the change gear.

In testimony whereof I hereunto affix my signature in the presence of two witnesses.

HIRAM H. SHELTERS.

Witnesses:
 EDWARD AUDINWOOD,
 CHAS. E. BENNETT.